US007419716B2

(12) United States Patent
Tian et al.

(10) Patent No.: US 7,419,716 B2
(45) Date of Patent: Sep. 2, 2008

(54) MULTIPLE GLOSS LEVEL SURFACE COVERINGS AND METHOD OF MAKING

(75) Inventors: Dong Tian, Lancaster, PA (US); Ralph W. Wright, Jr., Lancaster, PA (US); Scott Whalen, Mount Joy, PA (US)

(73) Assignee: AWI Licensing Company, Wilmington, DE (US)

( * ) Notice: Subject to any disclaimer, the term of this patent is extended or adjusted under 35 U.S.C. 154(b) by 663 days.

(21) Appl. No.: 10/448,758

(22) Filed: May 30, 2003

(65) Prior Publication Data

US 2004/0241416 A1 Dec. 2, 2004

(51) Int. Cl.

| | |
|---|---|
| ***B32B 3/30*** | (2006.01) |
| ***C08J 7/04*** | (2006.01) |

(52) U.S. Cl. ....................... 428/156; 428/158; 428/161; 428/198; 427/494; 427/493; 427/504; 427/510

(58) Field of Classification Search ............. 428/304.4, 428/198, 156, 158, 161; 427/494, 493, 504, 427/510

See application file for complete search history.

(56) References Cited

U.S. PATENT DOCUMENTS

| | | | | |
|---|---|---|---|---|
| 3,259,515 | A * | 7/1966 | Pecker | 428/491 |
| 3,966,572 | A * | 6/1976 | Carder | 523/466 |
| 4,172,169 | A | 10/1979 | Mawson et al. | 428/159 |
| 4,464,423 | A | 8/1984 | LaBianca et al. | 427/244 |
| 6,326,074 | B1 | 12/2001 | Takahashi | 428/156 |
| 6,759,096 | B2 * | 7/2004 | MacQueen et al. | 427/494 |
| 6,890,625 | B2 * | 5/2005 | Sigel et al. | 428/195.1 |
| 2002/0168501 | A1 * | 11/2002 | Siegel et al. | |

FOREIGN PATENT DOCUMENTS

| | | |
|---|---|---|
| EP | 1 149 712 A1 | 10/2001 |
| FR | 2 831 563 | 10/2001 |
| WO | WO 99/39042 | 8/1999 |

OTHER PUBLICATIONS

Database WPI, XP-002292397, abstract of JP05 278189A dated Oct. 26, 1993.

European Search Report Communication—Application No. EP 04 01 1312 dated Aug. 30, 2004.

* cited by examiner

*Primary Examiner*—Hai Vo

(57) ABSTRACT

Methods for providing surface coverings with differential gloss, and surface coverings prepared by the method, are disclosed. The methods involve screen printing or rotogravure printing a relatively low gloss primer onto portions of a substrate surface covering. The primer-coated substrate is then coated with a relatively higher gloss coating composition, and the coating compositions are cured, advantageously in a single curing step. The result is a surface covering including a top coat having a lower gloss level overlying the primer and a higher gloss level in the regions not overlying the primer.

43 Claims, No Drawings

MULTIPLE GLOSS LEVEL SURFACE COVERINGS AND METHOD OF MAKING

FIELD OF THE INVENTION

The present invention relates to surface coverings, including resilient floor coverings or wallpaper, and methods of making surface coverings. In particular, the present invention relates to surface coverings having a difference in gloss in selected regions or zones, and methods of making such surface coverings.

BACKGROUND OF THE INVENTION

The ability to produce flooring products with differential gloss in selected areas is very desirable from a design perspective. A variety of surface coverings are designed to have different levels of texture, gloss, embossing, and the like, as part of their design. For example, a vinyl floor covering that is intended to mimic the look of a ceramic tile floor might have a relatively high gloss in those areas of the floor covering that mimic the ceramic tiles, and relatively low levels of gloss in those areas of the floor covering that mimic the grout lines.

It would be advantageous to provide methods for providing differential gloss in surface coverings that do not involve two separate curing processes, and surface coverings prepared by such methods. It would also be advantageous to provide methods for providing differential gloss coatings that can be prepared without UV-curing methods. The present invention provides such surface coverings and methods.

SUMMARY OF THE INVENTION

The present invention provides a method for providing surface coverings with zoned differential gloss, and surface coverings prepared by the method. The method involves obtaining a surface covering substrate to be provided with a top coat layer, and applying, for example, by screen printing or rotogravure printing, a relatively low gloss primer in certain portions of the substrate. The primer can be applied, for example, in the form of a pattern or design. The substrate is then coated with a relatively higher gloss coating composition, and the coating compositions can then be cured, advantageously in a single curing step. The method can incorporate coating compositions that are heat curable and do not require expensive UV-curing equipment. The method allows one to produce zoned differential gloss products (i.e., products with different gloss levels in different zones or regions on a top coated surface) with a minimum capital/tooling expenditure.

The substrate to be coated may be a surface covering, such as a floor covering, that is rotogravure-printed with a design. Such substrates typically include one or more of a bottom support or backing layer, a foamable layer, a design layer and a wear layer. The foamable layer can include chemicals that initiate foaming in certain portions of the layer, for example, in register with a pattern or design. The foamable layer is commonly a plastisol, which can be heated to expand the foamable layer before the top coat is applied or can be gelled (and thus unexpanded) when the top coat is applied.

The substrate also can include a design layer. The designs can vary, but typically are designs in which varying gloss levels are desired. Examples of such designs include natural wood, stone, marble, granite, or brick, where the design includes mechanically and/or chemically embossed joint or grout lines. A chemical embossing agent that inhibits or promotes expansion of an underlying foam layer optionally can be printed in portions of the design.

The low gloss primer is applied over the topmost layer of the substrate before the top coat layer. The topmost layer of the substrate can be a foamable layer, a design layer, or a wear layer. Many methods of applying the primer can be used, for example, rotogravure printing, intaglio printing, flat screen printing, rotary screen printing, and flexo printing. A wide range of meshes can be used with the screen printing. For screen printing, the typical viscosity of the low gloss primer is between about 1000 and about 7000 cps. The primer can be applied in register with a printed design, if desired. The primer can be a water-based, solvent-based or 100% solids composition. When the primer is a water-based composition or solvent-based composition, the primer may be heated to evaporate the water or solvent.

The relatively higher gloss coating can be a water-based, solvent-based or 100% solids coating composition, typically with a viscosity less than about 10,000 cps, and sometimes less than about 7000 cps, at the temperature at which it is applied. The relatively higher gloss coating can then be applied using any of a variety of known coating methods, for example, using a wire-wound rod or forward roll coater, such as Model # LAS 24 made by BTG Coating Systems (U.S. Pat. No. 3,647,525). The thus-coated substrate can then be fused to produce a surface covering with differential gloss in desired regions/zones.

The top coated substrate can be subjected to mechanical embossing, including conventional and reverse mechanical embossing and/or chemical embossing, where the embossing is typically in register with a design.

The ratio of the thickness of relatively lower gloss primer versus the thickness of the relatively higher gloss coating can influence the final result. For example, the difference in gloss in the different zones/regions of the top coated substrate can be varied by adjusting 1) the thickness of the high gloss coating, 2) the thickness of the primer which can be affected by the ratio of the screen meshes versus the percentage of open area in the printed pattern of the primer, or the rotogravure etching parameters used to print the primer, and 3) the formulation of the primer. For example, screen printing typically can be accomplished with screens of 20-200 mesh and with 15-50% open area. However, the important parameter is that the printed lower gloss primer must provide a visual difference in surface gloss in the final product.

DETAILED DESCRIPTION OF THE INVENTION

The invention provides methods for producing zoned differential gloss decorative surface coverings, such as floor, wall and ceiling coverings. The present invention provides a way to achieve zoned differential gloss in a controlled manner with heat-curable and/or UV-curable top coat compositions. The method can provide improved reverse embossed images and more attractive mechanical embossing in register than is possible with a single gloss level high performance coating. Ideally, the primer composition and the top coat composition have relatively strong interlayer adhesion (i.e., the two compositions, when cured, do not delaminate under conditions of normal use).

The methods described herein can be used with heat-curable or UV curable top coat compositions suitable for application to decorative surface coverings. The final decorative surface covering, such as vinyl flooring, can have multiple gloss zones depending on how many differential gloss level primers are employed. The methods are particularly well suited for use with water-borne heat-curable coatings and water-borne UV-curable coatings.

The combination of the primer and top coat compositions, when applied and cured as described herein, can provide a wide range of differential gloss in register with the primer composition by adjusting primer application/thickness and formula, and the gloss of the higher gloss coating. As used herein, gloss or gloss level is determined in accordance with ASTM D 1455. Low gloss means a 60° gloss value of less than 30 units. Medium gloss means a gloss value of between 30 units and 60 units. High gloss means a gloss value of greater than 60 units. In one embodiment, the difference between the relatively lower gloss areas and the relatively higher gloss areas is at least about 10 gloss units, and in another embodiment, the difference is at least about 20 gloss units. In a further embodiment, the difference in gloss is less than about 80 gloss units. In still another embodiment, this difference in gloss is less than about 70 gloss units.

The present invention will be better understood with reference to the following detailed description.

Decorative Surface Coverings

Specific examples of surface coverings that can be prepared using the compositions and methods described herein include surface coverings that are chemically and/or mechanically embossed. In one embodiment, the surface covering has a natural wood, stone, marble, granite, or brick appearance, though other surface coverings are within the scope of the invention. For purposes of the present invention, surface coverings include, but are not limited to, flooring such as in-laid floors, hardwood floors, solid vinyl tiles, homogeneous floors, cushioned floors, and the like; wall paper; laminates; and countertops.

The substrate of the decorative surface covering to which the top coat is applied typically includes one or more of a support layer, a foamable layer (typically overlying the support layer), a print layer (typically overlying the foamable layer), and a transparent or translucent wear layer (typically overlying the print layer). The top coat layer overlies the topmost layer of the surface covering substrate, typically the clear wear layer, with a primer layer applied in selected zones/regions before the top coat layer is applied over substantially all of the topmost layer to provide zoned differential gloss. The term "substantially all" as used herein has its ordinary meaning of "largely but not wholly" and also means "entirely all." Therefore, the top coat covers the entire surface of the topmost layer or covers almost all of the surface of the topmost layer.

Support Surface/Backing Layer

The surface covering substrates that are coated using the compositions and methods described herein can include a resilient support surface/backing layer (hereinafter, "backing layer"), and the backing layer can be any conventional backing layer suitable for use in surface coverings. Such backing layers are well known in the art, and can be formed from materials including, for example, vinyl polymers such as polyvinyl chloride, polyester, saturated glass, for example, non-woven fiberglass, and felted or matted fibrous sheets of overlapping intertwined filaments and/or fibers. The filaments and/or fibers are typically of natural or synthetic cellulosic origin, such as cotton or rayon, although many other forms of sheets, films, textile materials, fabrics, and the like, can be used. Examples of suitable backing layers include those formed from non-foamed, non-crosslinked vinyl compositions as well as, for example, cellulosic felt, fiber glass scrim, and polyester non-woven sheets.

The backing layers can be formed, for example, from plastisols, foamed plastisols, randomly dispersed vinyl particles, stencil-disposed vinyl particles, and the like. The selection of these materials is within the skill of an ordinary artisan. The thickness of a conventional backing layer is generally not critical and it is preferably from about 2 to about 100 mils, more preferably from about 10 to about 30 mils. When a felt base layer, such as a beater-saturated felt layer, is used, the thickness of the layer is typically, but not necessarily, in the range of about 10 to about 30 mils.

The resilient support layer can include or be adjacent to a hot-melt calendared layer, for example, of a polyvinyl chloride, polyolefin or other thermoplastic polymer. The thickness of this layer may be from 15 to 60 mils, although thicknesses outside this range can be used.

Foamable Layer

In some embodiments, little or no expansion in some or all layers of the surface covering is required, and accordingly, no foam layer is required. However, the surface coverings range from those where all layers except the top coat are foamed to those where none of the constituent layers are foamed.

The foamable layer, where present, can be any conventional foamable layer suitable for use in surface coverings, such as a foam layer used in flooring. In particular, the foamable layer can be formed from any material suitable for producing foam layers, including polyvinyl chloride plastisols and organosols. Alternatively, the foam layer can be a resilient, cellular foam layer that can be formed from a resinous composition containing a foaming or blowing agent that, when heated, causes the composition to expand.

In one embodiment, the foamable layer is applied as a foamable gel, and the gel can include foaming agents, promoters and/or inhibitors. The thickness of the gel layer is typically, but not necessarily, in the range of 6 to 20 mils in an unblown state, and between 12 and 60 mils when blown ("cured").

Chemical blowing agents (foaming agents) are well known in the art, and include, for example, azo compounds such as azodicarbonamide (Celogen AZ from Uniroyal). Activators such as zinc oxide can be used to reduce the decomposition point of the blowing agents from 220° C. to less than 170° C. Inhibitors, such as benzotriazole and tolyl triazole, also can be used. A supplemental blowing agent such as aluminum trihydrate also can be used, as it not only acts as a flame retardant but also gives off water vapor when heated above 200° C. A volatile fugitive processing aid or plasticizer also can be used as a supplemental blowing agent.

Typically, the foaming is done by subjecting the foamable layer to elevated temperatures, for example, in the range of between about 120 and about 250° C., in one embodiment, between about 180 and about 250° C., for between about 0.5 and about 10 minutes. In one embodiment, the layer is foamed by heating the substrate to a temperature between about 195° C. and about 215° C. for a time of between about 2.5 minutes and about 3.0 minutes. These conditions also can be used to cure the primer layer and the top coat layer described herein. Temperatures outside of these ranges can be used provided they are effective at expanding the foamable layer and/or curing the primer and top coat layers.

Chemical Embossing

The foamable, resinous layer can be selectively embossed by controlling the decomposition temperature of a catalyzed blowing or foaming agent in the heat-expandable composition. For example, by applying a reactive chemical compound (a foaming or blowing agent modifier or inhibitor, also known as a "regulator," "inhibitor," or "retarder") to a heat-expandable composition, it is possible to modify the decomposition temperature of the catalyzed foaming or blowing agent in the area of application of the reactive compound. This is known as chemical embossing, and where the inhibitor is applied in register with a printed pattern or design, this is known as chemical embossing in register.

Chemical embossing in register with a printed pattern or design can be accomplished by printing an ink composition containing inhibitors (such as benzotriazole and tolyltriazole) on the surface of a foamable substrate or layer containing a blowing agent, and heating the resulting structure. Alternatively, the foaming agents and inhibitors can be present in the foamable gel layer itself. Such agents provide chemical embossing in register with the foaming agents, promoters and/or inhibitors, where the foamed portion corresponds to the presence of the foaming agent and/or promoter, and the unfoamed portion corresponds to the absence of the foaming agent and/or the presence of a foaming inhibitor.

It is thus possible to produce sheet materials including surface areas that are depressed proximate areas where inhibitor is applied and raised proximate areas where inhibitor has not been applied. That is, the foamable layer can be subjected to conditions that cause foaming only to occur in selected regions, which regions are in register with a printed pattern or design. Such chemical embossing can be used to create surface coverings with a desired three-dimensional appearance.

The surface covering can include a chemically embossed layer, formed before, during or after the coating composition is applied and cured. This type of layer is typically applied as a foamable gel, and the gel can include foaming agents or foaming promoters or inhibitors. The chemically embossed layer also can be prepared by applying a foaming or blowing agent, ideally in a pattern or design, over at least a portion of the expandable resinous layer.

Design Layers

Typically, the surface covering includes a printed pattern or design layer. The design layer can be printed using any of a variety of printing methods, including screen printing and rotogravure printing. Printed pattern or design layers are typically less than one mil in thickness when applied using a rotogravure process, and one mil or greater when applied using a screen printing process. When the print layer includes foaming inhibitors, it is capable of providing chemical embossing to the gel layer.

Certain designs are particularly well suited for differential gloss applications. Examples of such designs include, but are not limited to wood, stone, marble, granite, or brick, where the design can include mechanically and/or chemically embossed joint or grout lines.

Inhibited Ink Compositions

In one embodiment, at least a portion of the design in the pattern or design layer comprises an inhibited ink composition (also referred to herein as a retarding composition), optionally containing printing ink. The foam-retarding, printing ink composition can be printed over the foamable layer. The foamable layer can be expanded by subjecting the substrate to a sufficient temperature for a sufficient time to expand the layer and thereby form an embossed region of the layer proximate the portion of the printing design that contains the foaming or blowing agent modifier or inhibitor.

Such ink compositions are well-known in the art and are generally based on an organic solvent carrier or vehicle system. Alternatively, an aqueous retarder printing ink composition can be used. However, the inhibited ink (retarder) compositions do not necessarily have to contain a printing ink.

Typically, aqueous retarder printing ink compositions include from about 20% to about 30% by weight of an acrylic resin binder, from about 6.5% to about 17% by weight or a foaming inhibitor such as tolyl triazole, from about 20% to about 30% by weight alcohol and/or a water-miscible organic solvent, and from about 35% to about 50% by weight water. A representative example of a suitable aqueous retarder printing ink composition is described in U.S. Pat. No. 5,169,435, the contents of which are incorporated in its entirety by reference herein. Other suitable foam-retarding, printing ink compositions are described in U.S. Pat. Nos. 4,191,581 and 4,083,907 to Hamilton; U.S. Pat. No. 4,407,882 to Houser, and U.S. Pat. No. 5,336,693 to Frisch, the contents of each of which are hereby incorporated by reference in their entirety.

In one embodiment, the design layer contains a pattern of joint or grout lines formed using at least one inhibited ink composition. Upon expansion of the foamable layer, these portions will be chemically embossed and will visually form joint or grout lines to simulate the lines that exist with natural wood, stone, marble, granite, or brick surfaces. The joint or grout lines created with the retarder composition generally will have a width of, for example, from about 1/16 inch to about 1/4 inch.

Non-Inhibited Ink Compositions

The portion of the design layer that does not include at least one inhibited ink composition is typically formed by a non-inhibited ink composition (also referred to as a non-retarder ink composition). Such ink compositions typically include a vinyl acrylic resin, water, alcohol and/or a water-miscible organic solvent, and one or more pigments or dyes. In forming a design having both an inhibited ink composition and a non-inhibited ink composition, the design layer can be applied in register using multiple station rotogravure printing.

Wear Layer

A wear layer, typically one that is transparent or translucent, can be applied over a print or design layer before or after the foamable layer is heated. When the wear layer is an uncured plastisol, it can be cured at the same time the foamable layer is foamed, the chemical embossing takes place, and the top coat layer is cured. The wear layer can be made of any suitable material for producing such wear layers. In one embodiment, the wear layer is a transparent polyvinyl chloride (PVC) layer. The dry film thickness of this PVC layer is not critical, but is typically between about 5 mils and about 50 mils, and more typically between about 10 mils and about 20 mils. Other examples of wear layer materials include acrylic polymers, polyolefins, and the like.

The wear layer can be applied to and adhered to a foamable layer or to an underlying print or design layer. Means to apply the wear layer to a foamable layer or design layer include, but are not limited to, reverse-roll coating. Once the wear layer is applied, the wear layer can be cured. This curing can be accomplished by subjecting the wear layer, along with a foamable layer, if present, and the substrate to a sufficient temperature, e.g., by heating, to cure the wear layer. One means for heating the wear layer and other layers in the substrate is a multi-zone gas-fired hot air oven, an example of which is described in U.S. Pat. No. 3,293,108, the contents of which are hereby incorporated by reference. The curing or heating step can expand a foamable layer, if present, to form a foam layer. For purposes of curing the wear layer, a sufficient temperature for a sufficient time can be used, and can be determined using no more than routine experimentation. Typically, this temperature is between about 195° C. and about 215° C., and the time ranges from between about 2.0 minutes and about 3.0 minutes, more typically between about 2.0 minutes and about 2.2 minutes. The thickness of the wear layer is typically, but not necessarily, between about 6 and about 20 mils, more typically between about 10 and about 20 mils. This curing step can also be delayed until after the low gloss primer and to coat have been applied.

Relatively Low Gloss Primer

A relatively low gloss primer (relative to the overlying relatively high gloss top coat) is applied over the substrate, typically over a design layer or a wear layer. The primer is typically a relatively low viscosity (i.e., a viscosity in the range of about 1000 to about 7000 cps, although primers outside this range can be used).

The low gloss primer includes a flatting agent and appropriate carrier(s). The primer can be a water-based, solvent-based or 100% solids composition. Flatting agents are well known in the art, and include inorganic (i.e., silica and/or alumina) and/or organic (nylon, polyurethane and/or polyurea) flatting agents. One example of an organic flatting agent is Pergopak M-3 (a urea-formaldehyde polymer sold by Martinswerk GmbH). Pergopak M-3 can be included in various concentrations to provide varying levels of gloss. For example, a high gloss can be obtained with little or no added Pergopak M-3, a low gloss with about 1.12%, and an ultra-low gloss with about 2.38% by weight. Typically, no more than about 2.5% by weight is used. Additional examples of suitable flatting agents include silica (i.e. OK412 sold by Degussa), and organic flatting agents such as Orgasol 2002 D NAT1 (polyamide or nylon sold by Atofina).

Examples of suitable carriers include acrylic emulsions, waterborne or aqueous dispersion resins, such as NeoCryl A-6044 and NeoCryl XK12 sold by NeoResins, Bayhydrol PR 435 sold by Bayer, UCAR Waterborne Vinyl AW-875 sold by Dow, and other ultra-low gloss waterborne coatings. PVC plastisols also can be used as carriers.

If more than two different gloss levels are desired, this can be accomplished by using more than one low gloss primer (i.e., two or more primers with different gloss levels) and/or applying more than one layer of the primer(s), and/or applying thicker or thinner primer layers, and/or creating the illusion of different gloss levels by printing the primer in a discontinuous micro dot pattern. The size and density of the primer micro dot pattern can be varied to create different visual gloss levels in the final product. A continuous transition from a lower gloss level to a higher gloss level can be obtained by varying the size and/or density of the primer micro dot pattern.

Relatively High Gloss Top Coat Composition

Any top coat composition compatible with the primer can be used. The term "compatible," as used herein, refers to top coat compositions that do not readily delaminate from the underlying primer post-cure. In one embodiment, the top coat composition is thermally cured, and in another embodiment, the top coat composition is UV-cured. The thickness of the coating layer is typically between about 0.2 and about 5 mils, although thicknesses outside of this range can be prepared. The viscosity of the top coat compositions for screen printing are typically less than 7000 cps at the temperature at which they are applied. As with the primer compositions, the top coat compositions also can include flatting agents, provided that the gloss level provided by the top coat composition is greater than that provided by the primer composition.

In a first embodiment, the top coat overlying the primer is at least about 10 gloss units lower than the top coat not overlying the primer as measured by ASTM D 1455. In a second embodiment, the top coat overlying the primer is at least about 20 gloss units lower than the top coat not overlying the primer composition. In the first embodiment, the top coat overlying the primer may be no greater than about 80 gloss units lower than the top coat not overlying the primer as measured by ASTM D 1455. In the second embodiment, the top coat overlying the primer may be no greater than about 70 gloss units lower than the top coat not overlying the primer composition. However, suitable gloss differences can range from the minimum the eye can perceive to a maximum that the aesthetics desired dictate.

In some embodiments, the relatively low gloss level is between about 10 and about 50 gloss units and the relatively high gloss level is between about 40 and about 90 gloss units with the difference in the gloss levels being about 10 gloss units or greater. The average gloss level for the relatively low gloss may be about 20 to about 40 gloss units in one embodiment. The average gloss level for the relatively high gloss may be about 60 to about 80 gloss units in one embodiment.

The coatings can be thermally cured coatings, an example of which is described in more detail below, or UV-curable coatings. The coatings are typically high performance coatings, and can range from high gloss to low gloss, with the proviso that the gloss of the primer is lower than that of high performance coating. By using a primer and a higher performance coating with different gloss levels, the final product will have at least two, and optionally more than two, different gloss zones depending on how many different gloss level primers are applied.

In one embodiment, the gloss level of the top coat overlying the primer was 10 gloss units greater than the gloss level of the uncoated primer. In this embodiment, the gloss level of the uncoated primer was at least 20 gloss units lower than the gloss level of the top coat not overlying the primer. The carrier, the level of gloss of the primer, the level of gloss of the top coat, and the application rates affect the amount of gloss level difference between the gloss level of the top coat overlying the primer and the gloss level of the top coat not overlying the primer. The mechanism determining the gloss level differential is not known.

From an environmental standpoint, it can be desirable to apply coating compositions to substrates using either one hundred percent solids coating compositions or waterborne coating compositions, to minimize the use of organic solvents. The one hundred percent solids coating compositions typically include photocurable resins, such as acrylates. The one hundred percent solids coating compositions are typically cured by irradiation, but may be cured with heat.

Those coating compositions that are dispersions, for example, certain waterborne coating compositions, can be stirred to maintain the dispersion of the particles until they are to be applied. The coating compositions can be applied to virtually any surface using techniques such as roll coating, flow coating or blade application, for example, using doctor blades, bird blades and drawdown blades. After the compositions are applied, they can be heated if desired, for example, above around 100° C., to remove the majority of the water or any organic solvents that may be present. By removing a majority of the water or solvent, smearing of the primer during top coat application is deterred. The edge of the printed primer remains sharp and the change in gloss levels remain crisp. If it is desired to slowly transition between the relatively low gloss level and the relatively high gloss level, this can be done by varying the primer dot density.

Thermally-Curable Top Coat Compositions

The thermally-curable top coat compositions can be water-based, one hundred percent solids or solvent-based coating compositions. In one embodiment, the coating is a waterborne, thermally curable coating composition. In another embodiment, the top coat composition is both thermally and radiation curable. In yet another embodiment, the top coat composition can be a water based UV curable resin composition.

Water-Based Top Coat Compositions

Water-based top coat compositions typically include an aqueous dispersion of a polyurethane resin, an epoxy resin, and optionally a polyvinyl chloride resin, and in one embodiment, include all three resins. The resin particles can be of any suitable particle size that can be stabilized in a dispersion. However, other water based compositions can be employed, as long as the desired gloss effect is achieved, along with good inter layer adhesion. This includes B-stage thermal/UV top coat compositions, and UV curable resin compositions.

In one embodiment, one or more of these resins includes reactive functional groups that react with epoxy groups and/or aminoplasts. The compositions also can include an aminoplast such as a melamine, and one or more curing agents. When two or more curing agents are used, they can affect the cure at different temperatures or different times at the same temperature. Additionally, the compositions can include flatting agents, colored metallic and/or polymeric particles, hard particles, surfactants, rheology modifiers, defoamers, and coalescing aids.

In one embodiment, the composition is an aqueous dispersion that includes an epoxy dispersion (0.01-30% by weight, in another embodiment, 14-30% by weight), polyurethane dispersion (0.01-35% by weight) and a vinyl dispersion (4-60% by weight, in another embodiment, 4-40% by weight). The composition also includes a melamine crosslinker (3.5-9.1% by weight). In another embodiment, the composition further includes two curing agents, one that induces curing at a faster rate and/or a lower temperature than the other. Examples of such curing agents are Nacure 2547, which can, for example, be present at between 0.64 and 2% by weight, and Nacure 1557, which can, for example, be present at between 0.01 and 2.9% by weight.

The individual components are described in more detail below.

Polyurethane Resin

Any suitable polyurethane resin can be used. In one embodiment, the polyurethane resins include reactive groups other than epoxy groups, such as hydroxy and/or thiol groups, which react with the epoxy groups in the presence of an acidic catalyst at elevated temperatures. In one embodiment, the epoxy resins have particle sizes are in the range of between 5 and 300 nm, and representative number average molecular weights in the range of 1,500 and 150,000. Examples of suitable polyurethanes include SpencerKellogg Products EA6010 (30% solids), and various Daotan polyurethanes (Solutia), Bayhydrol polyurethane dispersions (Bayer), such as Bayhydrol PR 435, also can be used. Bayhydrol PR 435 is an aqueous aliphatic polyurethane dispersion that contains only 5% by weight of organic cosolvent, and includes about 35 wt. % solids.

Polyvinyl Chloride Resin

As used herein, polyvinyl chloride is intended to include homopolymers including only vinyl chloride units, copolymers that include two homopolymers such as vinyl chloride and vinyl acetate, and compositions including such homopolymers and copolymers. Any suitable polyvinyl chloride resin can be used.

In one embodiment, the polyvinyl chloride resins include reactive groups other than epoxy groups, such as hydroxy and/or thiol groups, which react with the epoxy groups in the presence of an acidic catalyst at elevated temperatures. In one embodiment, the resins are hydroxy terminated resins. In one embodiment, the polyvinyl chloride resins have particle sizes are in the range of between 40 and 600 nm, and representative number average molecular weights in the range of 5,000 and 60,000. One example of a suitable resin is UCAR Waterborne Vinyl AW-845 (Union Carbide), which has an emulsion particle size of about 0.08 micron, a molecular weight of about 24,000, a glass transition temperature of about 80° C. and a hydroxy (OH) equivalent weight of about 1005.

Epoxy Resins

In one embodiment, the epoxy resins include reactive groups other than epoxy groups, such as hydroxy and/or thiol groups, which react with the epoxy groups in the presence of an acidic catalyst at elevated temperatures. The epoxy resins may include more reactive groups, for example, more hydroxy groups, than epoxy groups. In one embodiment, the epoxy resins have particle sizes are in the range of between 300 and 1,000 nm, and representative number average molecular weights in the range of 400 and 8,000. Examples of suitable epoxy resin include EPI-REZ Resin 3541-WY-55 and RSW-3009 (both made by Resolution Performance Products). These resins include approximately 5 hydroxy groups and 2 epoxy groups per molecule.

Melamine

Aminoplasts, of which melamines are examples, can be present in the compositions. The melamines, also known as triaminotriazines, may or may not be partially or substantially methylolated, and the methylol groups may or may not be partially or substantially etherified with $C_{1-10}$ straight chain, branched or cyclic alkyl groups.

Many of these compounds are commercially available and sold, for example, as Cymel crosslinking agents by the Cytec Industries, Inc., for example Cymel 301, and as Resimene resins by Solutia. Resimene 745 is an example of a suitable Resimene resin.

Curing Agents

The curing agents are typically acidic catalysts. They can be used to catalyze the curing reaction between the melamine component, polyurethane resins that include reactive groups, such as hydroxy-urethanes, the epoxy component, and polyvinyl chloride resins that include reactive groups, such as hydroxy-PVC resins. Examples of suitable catalysts include sulfonic acids, such as methane sulfonic acid, alkylated arylsulfonic acids such as p-toluenesulfonic acid, alkylated napthylsulfonic acids such as dinonyl napthalene sulfonic acid and dinonyl napthalene disulfonic acid. Other acids such as citric acid, maleic acid, phthalic acid and the like also can be used. The catalysts may be in the free acid form, or can be stabilized, for example, by using an amine to neutralize the acid, for example, an amine blocked dinonylnaphthalene sulfonic acid catalyst. The only restriction is that the catalysts are compatible with other components in the system. Such catalysts are well known to those of skill in the art and their selection is within the capability of the ordinary artisan.

Nacure catalysts (King Industries) are examples of suitable catalysts. Specific examples include Nacure 2547 and Nacure 1557. Nacure 2547 is a faster curing catalyst and 1557 is a slower curing catalyst. Nacure 1557 (dinonylnaphthalene sulfonic acid type) requires about 40° C. higher curing temperature than Nacure 2547 (p-toluene sulfonic acid type. In one embodiment, when two curing agents that promote curing at different temperatures are used, the curing temperatures differ by at least about 25° C. When a combination of catalysts is used, the catalysts may each affect a cure at a different temperature, or at different times at the same temperature.

UV-Curable Top Coat Compositions

The UV-curable coating compositions used herein include at least one UV-curable component, typically a monomer or oligomer including ethylenic unsaturation. The compositions also can include one or more aqueous and/or organic solvents, reactive diluents, UV photoinitiators, curing altering agents and other optional components. An example of a suitable coating composition is described in U.S. Pat. No. 5,719,227, the contents of which are hereby incorporated by reference. The individual components are described in more detail below. Additional examples also include water based UV curable compositions as described in U.S. Pat. No. 6,011,078, the contents of which are hereby incorporated by reference.

Oligomers Including Ethylenic Unsaturation

Oligomers are widely used in commercially available coating compositions, and can be included in the coating compositions described herein. Examples of such oligomers include urethane acrylates, epoxy acrylates, polyether acrylates and/or polyester acrylates. Additionally, UV cationic cured compositions including epoxy type can also be employed.

Representative urethane acrylates include various urethane acrylates supplied by the Sartomer division of Total, including CN 945, CN95 3, CN 961, CN 962, CN 963, CN 964, CN 965, CN 966, CN 980, CN 198, CN 982, CN 983, CN 984 CN 985, CN 986, CN 970, CN 971, CN 972, CN 973, CN 975, CN 977, CN 978, CN 1 963 and CN 104; as well as urethane acrylates supplied by UCB Chemicals, including Ebecryl™ 244, Ebecryl™ 264, Ebecryl™ 270 Ebecryl™ 284, Ebecryl™ 1290, Ebecryl™ 2001, Ebecryl™ 4830, Ebecryl™ 4833, Ebecryl™ 4835, Ebecryl™ 4842, Ebecryl™ 4866, Ebecryl™ 4883, Ebecryl™ 5129, Ebecryl™ 8301, Ebecryl™ 8402, Ebecryl™ 8800, Ebecryl™ 8803, Ebecryl™ 8804, Ebecryl™ 8807 and Ebecryl™ 3604; and also urethane acrylates supplied by Rahn, including Genomer™ 4205, Genomer™ 4215, Genomer™ 4246, Genomer™ 4269; Genomer™ 4297, Genomer™ 4302, Genomer™ 4312, Genomer™ 4316, Genomer™ 4510, Genomer™ 4661, Genomer™ 4205, Genomer™ 5248, Genomer™ 5275, Genomer™ 5695 and Genomer™ 7154; as well as urethane acrylates supplied by Photomer Energy Curing Chemicals, including Photomer® 6008, Photomer® 6010, Photomer® 6022, Photomer® 6184, Photomer® 6210, Photomer® 6217, Photomer® 6788-20R, Photomer® 6893, RCC™ 12-891, RCC™, 12-892, RCC™ 13-363 and Photomer® 6173.

Representative epoxy acrylates include various epoxy acrylates supplied by the Sartomer division of Total, including CN 111, CN 112 (an epoxidized soybean oil acrylate), CN 115 (an epoxy novolak acrylate), CN 117, CN 118, CN120 (an acid-modified epoxy acrylate), CN 124, CN 151 and CN 130.

Representative polyester acrylates include various polyester acrylates supplied by the Sartomer division of Total, including CN 704 and CN 301, and also polyester acrylates supplied by Photomer Energy Curing Chemicals, including Photomer® 5018, RCC™ 13-429, RCC™ 13-430, RCC™ 13-432, RCC™ 13-433 and RCC™ 13-424.

Reactive Diluents

The polyols, particularly acrylate polyols, and urethane acrylates prepared from the polyols and acrylated polyols, can be combined with suitable reactive diluents to form UV-curable 100 percent solids coating compositions. The reactive diluent(s) are typically low molecular weight (i.e., less than 1000 g/mol), liquid (meth)acrylate-functional compounds. Examples include, but are not limited to: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate and ethoxylated derivatives thereof, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, and ethoxylated bisphenol-A diacrylate. Another example of a reactive diluent is N-vinyl caprolactam (International Specialty Products). Further examples are the commercially available products from Sartomer, SR 489, a tridecyl acrylate and SR 506, an isobornyl acrylate.

Photoinitiators

The compositions also can include a sufficient amount of a free-radical photoinitiator such that the compositions can be UV-cured. Typically, the concentration of photoinitiator is between 1 and 10% by weight, although weight ranges outside of this range can be used. Alternatively, the compositions can be cured using electron beam (EB) curing.

Any compounds that decompose upon exposure to radioactive rays and initiate the polymerization can be used as the photoinitiator in UV-curable compositions including the polyols, acrylated polyols and/or urethane acrylates prepared from the polyols or acrylated polyols. Photosensitizers can be added as desired. The term "radiation" as used in the present invention include infrared rays, visible rays, ultraviolet rays, deep ultraviolet rays, X-rays, electron beams, alpha-rays, beta-rays, gamma-rays, and the like. Representative examples of the photoinitiators include, but are not limited to, acetophenone, acetophenone benzyl ketal, anthraquinone, 1-hydroxycyclohexylphenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, xanthone, 1,1-dimethoxydeoxybenzoin, 3,3'-dimethyl-4-methoxybenzophenone, thioxanethone compounds, diethylthioxanthone, 2-isopropylthioxanthone, 2-chlorothioxanthone, 1-(4-dodecylphenyl)-2-hydroxy-2-methylpropan-1-one, 2-methyl-1-[4-(methylthio)phenyl]-2-morpholino-propan-1-one, triphenylamine, 2,4,6-trimethylbenzoyldiphenylphosphineoxide, bis-(2,6-dimethoxybenzoyl)-2,4,4-trimethylpentylphosphine oxide, bisacylphosphineoxide, benzyl dimethyl ketal, fluorenone, fluorene, benzaldehyde, benzoin ethyl ether, benzoin propyl ether, benzophenone, Michler's ketone, 2-benzyl-2-dimethylamino-1-(4-morpholinophenyl)-butan-1-one, 3-methylacetophenone, and 3,3',4,4'-tetra(t-butylperoxycarbonyl) benzophenone (BTTB).

Commercially available photoinitiators include, but are not limited to, Irgacure® 184, 651, 500, 907, 369, 784 and 2959 and Darocur® 1116 and 1173 (manufactured by Ciba Specialty Chemicals Co., Ltd.), Lucirine TPO (manufactured by BASF), Ubecryl® P36 (manufactured by UCB), and Esca-cure® KIP150, KIP100F (manufactured by Lamberti).

Representative examples of photosensitizers include, but are not limited to, triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate, as well as commercially available products such as Ubecryl® P102, 103, 104 and 105 (manufactured by UCB), and the like.

The photoinitiators are typically present in the range of from 0.01 to 10 percent by weight of the top coat composition, although amounts outside this range can be used. Thermal initiators, such as AIBN and di-t-butyl peroxide can be used in place of or in addition to the photoinitiators.

Optional Components

Regardless of whether thermally-curable or UV-curable coating compositions are used, the following optional components can be present. Metallic and/or polymeric particles, hard particles and colored particles also can be added. Coalescing aids also can be added. Texanol coalescing aids (Eastman Chemicals) are an example of a suitable coalescing aid. Rheology modifiers, such as Acrysol® brand rheology modifiers made by Rohm and Haas, also can be added. Acrysol RM-825 is an example of a suitable non-ionic rheology modifier.

Hard particles include, but are not limited to, aluminum oxide, quartz, carborundum, silica and glass beads. In one embodiment, the hard particles are particles with a hardness of 6 or more on the Mohs scale.

Surfactants can be added to impart additional stain resistance to the coated substrate. Examples of suitable surfactants include fluoroaliphatic and non-ionic surfactants. Combinations of surfactants also can be used. Examples of suitable surfactants include Fluorad surfactants such as Fluorad FC-340 and Fluorad FC-170-C (3-M Company), and Igepal-type surfactants made by Rhodia. In one embodiment, a non-foaming commercially available surfactant is used, which has the properties of both a surfactant and defoamer. CoatO-Sil1211 (Witco) is an example of a suitable non-foaming surfactant. It is a composition of trisiloxane alkoxylate, siloxane polyalkyleneoxide copolymer and polyalkylene oxide.

Defoamers can be added in suitable quantities. Colloid 640/rhodoline 640 made by Rhodia is an example of a silica-type defoamer that includes petroleum hydrocarbon, hydrophobic silica and amorphous silica.

Methods of Providing Differential Gloss Surface Coverings

The methods for providing differential gloss surface coverings involve first providing a substrate to be coated, as described above, and printing the primer in desired regions of the substrate. The relatively lower gloss primer can be printed over the substrate in any suitable manner, including flat screen printing, rotary screen printing, rotogravure printing and intaglio printing. The primer is advantageously coated over a non-porous surface. Where the primer includes an aqueous or organic solvent, the primer can optionally be heated to a proper temperature to remove the solvent before the top coat is applied thereby improving clarity by deterring smearing of the primer. By removing the solvent before applying the top coat, the edge of the printed primer remains sharp and the change in gloss levels remain crisp. If it is desired to slowly transition between the relatively low gloss level and the relatively high gloss level, this can be done by varying the primer dot density.

After the primer is applied, but advantageously before it is completely cured, the relatively higher gloss top coat composition is applied over substantially all of the substrate and cured by applying sufficient heat and/or UV, depending on the curable components in the top coat composition, to cure the coating composition. This produces a zone gloss differential, where the areas printed with the primer exhibit a lower gloss than the areas not printed with the primer.

Multiple levels of gloss can be obtained by printing two different primer compositions having different cured gloss levels or by adjusting 1) the thickness of the high gloss coating or 2) the thickness of the primer which can be affected by the ratio of the screen meshes versus the percentage of open area in the printed pattern of the primer, or the rotogravure etching parameters used to print the primer. The illusion of different gloss levels can be created by printing the primer in a discontinuous micro dot pattern. The size and density of the primer micro dot pattern can be varied to create different visual gloss levels in the final product. A continuous transition from a lower gloss level to a higher gloss level can be obtained by varying the size and/or density of the primer micro dot pattern.

As discussed above, in some embodiments in which there is a foamable gel layer, the layer can include various foaming agents, foaming inhibitors and/or foaming promoters. Such agents, inhibitors and/or promoters, which are well known to those of skill in the art, also can be present in an adjacent print layer. With different amounts or concentrations of foaming agent in a particular region, for example, in register with a print pattern, the foamable layer is foamed to different levels, resulting in chemical embossing. The presence of a foaming promoter or inhibitor in the pattern also affects the degree of foaming in the pattern.

Methods of Curing the Composition

Depending on the particular coating compositions used, the compositions can be cured by exposure to heat and/or UV or EB curing conditions.

Heat Curing

Those compositions including heat-curable components can be cured using conventional heat curing techniques, for example, exposure to microwave, IR irradiation or heated air impingement ovens, whether or not there is a chemically embossed surface. However, it is advantageous to heat cure surface coverings that include a chemically embossed layer.

Suitable temperature ranges for heat curing a foamable layer and a heat-curable top coat composition, such as a waterborne composition including epoxy resins and/or melamine resins, have been described above with respect to curing a foamable layer.

The heat curing can be effected at a plurality of temperatures and heating stations. Alternatively, the curing can be effected at one temperature, where one of the foamable layer and the wear layer is cured faster than the other. For example, when a combination of curing agents is used, one curing agent in the composition can initiate and partially cure the top coat at a first temperature while the foamable layer is expanding and curing, and a second curing agent can finish the cure of the top coat at a second, higher temperature. This can permit the chemical embossing to take place while the top coat is flexible, and permit the top coat to completely cure after the chemical embossing takes place. This can provide adequate chemical embossing and a rigid top coat.

UV-Curing

Those compositions including UV-curable components can be cured subjecting the top coat layer to sufficient UV-energy to cure the UV-curable components. UV irradiation polymerizes the ethylenically unsaturated groups in the UV-curable components of the coating composition, turning the liquid as applied to a gel or solid layer. The polymerization is typically done in the presence of oxygen, but in some cases it can be done in an inert atmosphere. The degree of curing can be effected by a number of factors, including temperature, UV peak intensity, and irradiation dosage. UV irradiation typically occurs between 200 and 400 nm. Photoinitiators can be matched to particular UV wavelengths. UV irradiation can be provided using any conventional UV source, examples of which include UV lamps such as microwave UV source lamps and standard medium pressure mercury vapor lamps. The irradiation can be conducted under an inert atmosphere or an oxygen-containing atmosphere. In one embodiment, the first set of polymerization conditions involves UV curing in an oxygen-containing atmosphere, and the second set of polymerization conditions involves UV curing in an inert or nitrogen-rich atmosphere.

Electron Beam Irradiation

The UV-curable components also can be cured by exposure to EB irradiation, which can be in the form of low voltage electrons. Electron beam curing is well known in the art, and can be conducted in a nitrogen-rich or inert atmosphere. The heat is essentially eliminated using accelerated electrons, which permits the cured layer to be kept below its glass transition temperature and remain free of distortion. In one embodiment, the electron accelerating energy is between 150,000 and 300,000 electron volts. In another embodiment, the energy is less than about 130,000 electron volts. Use of energy less than about 130,000 electron volts can minimize discoloring, such as yellowing, which is relatively important for white decorative rigid film coatings.

Representative EB conditions are described in U.S. Pat. No. 6,110,315, the contents of which are hereby incorporated by reference. In one embodiment, the EB conditions involve low accelerating energy.

Mechanical Embossing

Mechanical embossing can be performed by subjecting the surface covering to an embossing roll under pressure, typically at a temperature at which the layer to be mechanically embossed is softened enough to be embossed. After the mechanical embossing, the layers may be annealed at a lower temperature, if desired.

The present invention will be better understood with reference to the following non-limiting examples.

EXAMPLE 1

Preparation of Relatively Low Gloss Primer

UCAR Waterborne Vinyl AW-875 (500 g) was charged into a 1-liter flask equipped with stirrer. CoatOSil 1211 (3.17 g), Texanol (9.00 g), Pergopak M-3 (25.00 g) and Acrysol RM-825 (2.00 g) were added one by one with good agitation at room temperature. The mixture was stirred for 5 minutes after adding all ingredients. The final viscosity of this relatively low gloss primer was 6640 cps at room temperature, with a solids content of 41%.

EXAMPLE 2

Waterborne Thermal Cure Relatively High Gloss Top Coat

The following formulation is a representative waterborne thermal cure relatively high gloss top coat useful in the methods described herein for providing a coating with zoned differential gloss. The components were charged in the order listed with good agitation at room temperature.

TABLE 1

Coating Composition

| Trade Name | Chemical Name | Function | Amount (parts by wt) |
|---|---|---|---|
| D.I. Water | Water | solvent | 138.75 |
| CoatOSil 1211 | Surfactant | wetting agent | 3.00 |
| Texanol | Coalescent - Ester alcohol | solvent | 10.74 |
| Acrysol RM-825 | Aqueous polyurethane | thickener | 2.34 |
| Resimene 745 | Methylated melamine formaldehyde resin | coupling agent | 54.15 |
| RSW-3009 | Epoxy dispersion resin | epoxy | 155.46 |
| Bayhydrol PR 435 | Polyurethane dispersion | resin | 183.60 |
| UCAR Waterborne Vinyl AW-875 | Waterborne Vinyl | resin | 41.76 |
| Nacure 2547 | Amine blocked p-toluene sulfonic acid | catalyst | 4.56 |
| Nacure 1557 | Amine blocked dinonynaphthalene sulfonic acid | catalyst | 5.64 |

EXAMPLE 3

Surface Coverings with Zoned Differential Gloss

A series of relatively low gloss primers were tested in a pilot plant. The formulations of the low gloss primers used in the tests are listed in Table 2 below. These primers were made by the process described in Example 1 and were drawn-down on a vinyl floor via #6 wire wound rod, and allowed to dry at ambient temperature for 30 minutes. Then, a waterborne thermal cure high gloss coating, as described in Example 2, was drawn-down on top of these dried primers via #18 wire wound rod, and cured at 375° F. for 2 minutes. The gloss readings (60°) for the top coat overlying the primer are listed in the last row of below table. The gloss of the relatively high gloss top coat not overlying the primer was 87 (60°).

TABLE 2

Representative Low Gloss Primers

| Trade Name | Chemical Name | Function | 1 Amt (g) | 2 Amt (g) | 3 Amt (g) | 4 Amt (g) | 5 Amt (g) | 6 Amt (g) |
|---|---|---|---|---|---|---|---|---|
| CoatOSil 1211 | Surfactant | wetting agent | 0.53 | 0.54 | 0.53 | 0.55 | 0.53 | 0 |
| Bayhydrol PR 435 | Polyurethane dispersion | resin | 100.00 | 100.00 | 100.00 | 100.00 | 0 | 0 |
| UCAR Waterborne Vinyl AW-875 | Waterborne Vinyl | resin | 0 | 0 | 0 | 0 | 100.00 | 0 |
| Stainless Coating | Acrylic emulsion | resin | 0 | 0 | 0 | 0 | 0 | 100.00 |
| Pergopak M-3 | Urea/form-aldehyde pol. | flatting agent | 5.00 | 5.00 | 0 | 10.00 | 5.00 | 2.00 |

TABLE 2-continued

| Representative Low Gloss Primers | | | | | | | | |
|---|---|---|---|---|---|---|---|---|
| Trade Name | Chemical Name | Function | 1 Amt (g) | 2 Amt (g) | 3 Amt (g) | 4 Amt (g) | 5 Amt (g) | 6 Amt (g) |
| Orgasol 2002 D NAT 1 | Polyamide | flatting agent | 0 | 0 | 3.00 | 0 | 0 | 0 |
| Orgasol 2001 EXD NAT 1 | Polyamide | flatting agent | 0 | 0 | 3.00 | 0 | 0 | 0 |
| Tert-Butyl Hydro peroxide 70% Soln | Tert-Butyl Hydroperoxide | catalyst | 0 | 2.00 | 0 | 0 | 0 | 0 |
| Total | | | 105.53 | 107.54 | 106.53 | 110.55 | 105.53 | 102.00 |
| Solids Level | | | 38.4% | 39.0% | 39.0% | 41.2% | 42.2% | 35.3% |
| Final Gloss (60°) | | | 62 | 64 | 54 | 48 | 22 | 85 |

EXAMPLE 4

Representative Method of Providing Zoned Differential Gloss

The flat screen printed primer prototype process was used to make Example 4 as follows. The substrate selected was a foamable Armstrong Destinations® base that was rotogravure printed with standard and BTA inks. A wear layer of clear plastisol was gelled to a thickness of about 12 mils on the print layer. A relatively low gloss primer similar to the primer of Table 2, no. 5 having a nominal viscosity of about 2000 cps was screen printed in register with the gravure print using a 60 mesh, 40% OA flat screen and a square edge squeegee and dried in a Hot Pack oven set at 325° F. to 260° F. heat tape. The dry thickness of the primer layer was between about 0.5 and 1.5 mils. A number #18 wire-wound rod was used to coat the primer coated substrate with the relatively high gloss coating of Example 2, and fused in a Hot Pack oven set to 410° F. to a heat tape temperature of 360-370° F. to produce chemical embossing in register and zoned differential gloss.

The average gloss level of the top coat not overlying the primer was about 77 gloss units. The gloss level of the top coat overlying the primer varied depending upon the thickness of the primer and the top coat. The average gloss level of the top coat having a thickness of about 0.3 mils and overlying the primer having a thickness of about 0.5 mils was about 28 gloss units. The average gloss level of the top coat having a thickness of about 0.5 mils and overlying the primer having a thickness of about 1 mil was about 37 gloss units.

EXAMPLE 5

Representative Pilot Plant Process

On a base that had previously been printed and clear coated, a low gloss primer similar to the primer of Table 2, no. 5 with a nominal viscosity of about 2000 cps was rotary screen printed with a 40 mesh, 30% OA, 5 mil Stork screen with a circle pattern produced via photo emulsion. A 15 mil stainless steel blade squeegee was used to push the primer through the screen in a simulation of the Stork screen printing method. A 40 mesh dot circle pattern deposition was produced at 15 feet per minute (fpm) and the primer was dried in a Bruckner oven set at 300° F. in 3 zones. On a second pass, a LAS 24 forward roll coater was used to apply the relatively high gloss coating composition of Example 2 in a nominal thickness of about 0.5 mils dry thickness over substantially all of the substrate. The top coat coated substrate was then heated. The product that came out of the oven on the second pass exhibited a top coat layer with relatively low gloss circle shaped regions corresponding to the printed primer pattern and all other regions exhibiting a relatively high gloss. It was also noted that the screen print "dot" pattern was maintained in the sample and this provided an enhanced differential gloss visual effect.

Having disclosed the subject matter of the present invention, it should be apparent that many modifications, substitutions and variations of the present invention are possible in light thereof. It is to be understood that the present invention can be practiced other than as specifically described. Such modifications, substitutions and variations are intended to be within the scope of the present application.

What is claimed is:

1. A surface covering comprising:

a) a surface covering substrate having a top surface and a bottom surface, wherein the top surface defines a continuous top layer, b) a primer overlying a portion of the continuous top layer, wherein the primer comprises a flatting agent, and c) a top coat overlying at least a portion of the primer and overlying substantially all of the top surface of the surface covering substrate, wherein the top coat overlying the primer has a gloss level less than the gloss of the top coat not overlying the primer, and wherein at least one portion of the top coat not overlying the primer is in direct contact with the continuous top layer of the substrate.

2. The surface covering of claim 1, wherein the difference in gloss level between the top coat overlying the primer and the top coat not overlying the primer is at least about 10 gloss units.

3. The surface covering of claim 2, wherein the difference in gloss level between the top coat overlying the primer and the top coat not overlying the primer is at least about 20 gloss units.

4. The surface covering of claim 1, wherein the difference in gloss level between the top coat overlying the primer and the top coat not overlying the primer is no more than about 80 gloss units.

5. The surface covering of claim 4, wherein the difference in gloss level between the top coat overlying the primer and the top coat not overlying the primer is no more than about 70 gloss units.

6. The surface covering of claim 1, wherein the gloss level of the top coat overlying the primer is between about 10 gloss units and about 50 gloss units, and the gloss level of the top coat not overlying the primer is between about 30 gloss units and about 90 gloss units.

7. The surface covering of claim 1, wherein the thickness of the primer is between about 0.2 mils and about 1.5 mils.

8. The surface covering of claim 7, wherein the thickness of the primer is between about 0.5 mils and about 1 mils.

9. The surface covering of claim 1, wherein the thickness of the top coat is between about 0.2 mils and about 1.5 mils.

10. The surface covering of claim 9, wherein the thickness of the primer coat is between about 0.5 mils and about 1 mils.

11. The surface covering of claim 1, wherein the gloss level of the top coat overlying a first portion of the primer is greater than the gloss level of the top coat overlying a second portion of the primer.

12. The surface covering of claim 1, wherein the primer is in the form of a dot pattern, the top coat being adjacent the substrate between the dots of the pattern.

13. The surface covering of claim 12, wherein the density of the dots in a portion of the primer gradually increases whereby the gloss level of the top coat overlying the primer gradually decreases.

14. The surface covering of claim 1, wherein the surface covering is a floor covering.

15. The surface covering of claim 14, wherein the floor covering includes a design selected from the group consisting of wood, stone, marble, granite, and brick.

16. The surface covering of claim 1, wherein the surface covering further comprises a printed design interposed between the top coat and the top layer of the substrate, wherein the printed design overlies at least one portion of the continuous top layer.

17. The surface covering of claim 16, wherein the primer is in register with the printed design.

18. The surface covering of claim 17, wherein the printed design is selected from the group consisting of joint lines, grout lines, veining, and combinations thereof.

19. The surface covering of claim 1, wherein the surface covering substrate further comprises a printed design and wherein the continuous top layer is a wear layer that overlies the printed design.

20. The surface covering of claim 1, wherein the surface covering substrate further comprises:

a) a backing layer, b) a chemically embossed foam layer comprising a chemically embossed region overlying the backing layer, and c) a design layer overlying the chemically embossed foam layer, wherein the continuous top layer is a wear layer overlying the design layer, wherein the primer overlies a portion of the wear layer, and the top coat overlies the primer and overlies substantially all of the wear layer.

21. The surface covering of claim 20, wherein the primer is in register with the chemically embossed region of the foam layer.

22. The surface covering of claim 21, wherein the chemically embossed region of the foam layer is in register with a design in the design layer.

23. The surface covering of claim 20, wherein the wear layer has a mechanically embossed surface texture.

24. A method of making a surface covering having regions of different gloss level, comprising:

a) providing a surface covering substrate having a top surface and a bottom surface, wherein the top surface defines a continuous top layer, b) applying a primer composition to a portion of the continuous top surface, wherein the primer composition comprises a flatting agent, c) applying a top coat composition to at least a portion of the primer and substantially all of the top surface of the surface covering substrate, and d) then curing the top coat composition, wherein the gloss level of the top coat overlying the primer has a gloss level less than the gloss of the top coat not overlying the primer, and wherein at least one portion of the top coat not overlying the primer is in direct contact with the continuous top layer of the substrate.

25. The method of claim 24, wherein the difference in gloss levels between the top coat overlying the primer and the top coat not overlying the primer is at least about 10 gloss units.

26. The method of claim 25, wherein the difference in gloss level between the top coat overlying the primer and the top coat not overlying the primer is at least about 20 gloss units.

27. The method of claim 24, wherein the difference in gloss level between the top coat overlying the primer and the top coat not overlying the primer is no more than about 80 gloss units.

28. The method of claim 27, wherein the difference in gloss level between the top coat overlying the primer and the top coat not overlying the primer is no more than about 70 gloss units.

29. The method of claim 24, wherein the gloss level of the top coat overlying the primer is between about 10 gloss units and about 50 gloss units, and the gloss level of the top coat not overlying the primer is between about 30 gloss units and about 90 gloss units.

30. The method of claim 24, wherein the primer is the applied at a thickness yielding a cured primer having a thickness of between about 0.25 mils and about 2 mils.

31. The method of claim 30, wherein the primer is the applied at a thickness yielding a cured primer having a thickness of between about 0.5 mils and about 1.5 mils.

32. The method of claim 24, wherein the top coat is the applied at a thickness yielding a cured top coat having a thickness of between about 0.25 mils and about 2 mils.

33. The method of claim 32, wherein the top coat is the applied at a thickness yielding a cured top coat having a thickness of between about 0.5 mils and about 1.5 mils.

34. The method of claim 24, wherein a first portion of the primer is applied having a first amount of primer composition and a second portion of the primer is applied having a second amount of primer composition, the first amount of primer composition being less than the second amount of primer composition whereby the gloss level of the top coat overlying the first portion of the primer is greater than the gloss level of the top overlying the second portion of the primer coat.

35. The method of claim 24, wherein the surface covering is a floor covering.

36. The method of claim 24, wherein the surface covering comprises a design feature interposed between the top coat and the top layer of the substrate, and the primer is printed in register with the design feature.

37. The method of claim 24, wherein the surface covering substrate comprises a chemically embossed foam layer, and the primer is printed in register with the chemical embossing.

38. The method of claim 24, wherein the surface covering substrate further comprises:

a) a backing layer, b) a chemically embossed foam layer comprising a chemically embossed region overlying the backing layer, and c) a design layer overlying the chemically embossed foam layer, wherein the continuous top layer is a wear layer overlying the design layer, wherein the primer is printed on the wear layer, and the top coat is applied overlying the primer and overlying substantially all of the wear layer.

39. The method of claim 24, wherein the difference in gloss level between the top coat overlying the primer and the top coat not overlying the primer is adjusted by adjusting the amount of the primer composition applied to the substrate.

40. The method of claim 24, wherein the primer is applied to the substrate by a printing method selected from the group consisting of rotogravure printing, flat screen printing, rotary screen printing, intaglio printing, and flexo printing.

41. The method of claim 24, wherein the primer is printed in a dot pattern, and the top coat is overlaid whereby the top coat is adjacent the substrate between the dots of the pattern.

42. The method of claim 41, wherein the primer is printed by screen printing, and the difference in gloss level between the top coat overlying the primer and the top coat not overlying the primer is adjusted by adjusting the mesh size of printing screen.

43. The surface covering of claim 1, wherein the top coat has more than two gloss levels.

* * * * *